United States Patent
Jung et al.

(10) Patent No.: US 9,551,895 B2
(45) Date of Patent: Jan. 24, 2017

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Yang-Ho Jung, Seoul (KR); Pil Soon Hong, Gwangmyeong-si (KR); Jun Hong Park, Yongin-si (KR); Seung Bo Shim, Asan-si (KR); Jin Ho Ju, Seoul (KR)

(73) Assignee: Samsung Display Co., Ltd. (KR)

( * ) Notice: Subject to any disclaimer, the term of this patent is extended or adjusted under 35 U.S.C. 154(b) by 140 days.

(21) Appl. No.: 14/308,104

(22) Filed: Jun. 18, 2014

(65) Prior Publication Data

US 2015/0198840 A1  Jul. 16, 2015

(30) Foreign Application Priority Data

Jan. 15, 2014 (KR) ........................ 10-2014-0005308

(51) Int. Cl.
*G02F 1/1333* (2006.01)
*G02F 1/1341* (2006.01)

(52) U.S. Cl.
CPC ....... *G02F 1/133377* (2013.01); *G02F 1/1341* (2013.01)

(58) Field of Classification Search
CPC .............. G02F 1/133377; G02F 1/1341; G02F 1/133345; G02F 1/1368; G02F 1/136209; G02F 1/133512; G02F 1/133514; G02F 1/134309; G02F 1/134336; G02F 1/134363; G02F 1/1339; G02F 1/136227; G02F 1/13394; G02F 1/1362; G02F 1/1333; G02F 1/133305; G02F 1/133711; G02F 1/133509; G02F 1/1343; G02F 1/136; G02F 2001/133368; G02F 2001/134345; G02F 2001/134318; G02F 2001/136222; G02F 2001/133565; G02F 2001/134372; G02F 2001/136218; G02F 2202/36; H01L 27/1259; H01L 27/56; H01L 29/786; G09G 2300/0426; G09G 2300/08; G09G 2380/02

(Continued)

(56) References Cited

U.S. PATENT DOCUMENTS 5,949,508 A * 9/1999 Kumar .................. G02F 1/1334
349/122
5,956,112 A * 9/1999 Fujimori ........... G02F 1/133305
349/156
6,141,072 A  10/2000 Drabik et al.

(Continued)

FOREIGN PATENT DOCUMENTS

JP  2013-074258  4/2013
KR  1020080070190 A  7/2008

(Continued)

*Primary Examiner* — Thoi Duong
(74) *Attorney, Agent, or Firm* — Innovation Counsel LLP

(57) ABSTRACT

A liquid crystal display is provided. The liquid crystal display includes: a substrate; a thin film transistor; a pixel electrode; a roof layer; a plurality of microcavities; and a partition wall. The thin film transistor is disposed on the substrate. The pixel electrode is disposed on the thin film transistor. The roof layer faces the pixel electrode. The microcavities are between the pixel electrode and the roof layer, the microcavities include a liquid crystal material. The partition wall is between the microcavities, and the partition wall is perpendicular to the roof layer.

8 Claims, 24 Drawing Sheets

(58) Field of Classification Search
USPC ............. 349/43, 86, 110, 42, 106, 138, 139, 123,349/89, 12, 122, 154, 155, 189, 156, 158, 153,349/141; 438/30, 151, 127; 257/72, 40, 98
See application file for complete search history.

(56) References Cited

U.S. PATENT DOCUMENTS

| | | | | |
|---|---|---|---|---|
| 7,612,859 | B2* | 11/2009 | Clark | ................ G02F 1/133377 |
| | | | | 349/110 |
| 2012/0062448 | A1* | 3/2012 | Kim | ................... G02F 1/133377 |
| | | | | 345/55 |
| 2013/0242228 | A1* | 9/2013 | Park | .................. G02F 1/133617 |
| | | | | 349/61 |
| 2013/0250220 | A1* | 9/2013 | Kim | ...................... G02F 1/1341 |
| | | | | 349/123 |

FOREIGN PATENT DOCUMENTS

| | | |
|---|---|---|
| KR | 100890211 B1 | 3/2009 |
| KR | 101145867 | 5/2012 |
| KR | 1020120067751 A | 6/2012 |

\* cited by examiner

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2014-0005308 filed in the Korean Intellectual Property Office on Jan. 15, 2014, the entire contents of which are incorporated herein by reference.

BACKGROUND (a) Field

The present application relates to a liquid crystal display and a manufacturing method thereof.

(b) Description of the Related Art

A liquid crystal display as one of flat panel display devices that are widely being used includes two display panels where field generating electrodes such as a pixel electrode and a common electrode are formed, and a liquid crystal layer is interposed therebetween.

The liquid crystal display generates an electric field in a liquid crystal layer by applying a voltage to the field generating electrodes, to determine orientations of liquid crystal molecules of the liquid crystal layer and control polarization of incident light, thereby displaying an image.

A technique of forming a cavity in a unit of a pixel and filling the cavity with liquid crystals to implement a display has been developed for one of the liquid crystal displays. This technique serves to manufacture a display by forming a sacrificial layer with an organic material and the like, forming a roof layer at an upper portion of the sacrificial layer, removing the sacrificial layer, and filling an empty space formed through the removal of the sacrificial layer with liquid crystals through a liquid crystal injection hole, instead of forming an upper panel on a lower panel.

However, the technique requires a lengthened process time for removing the sacrificial layer.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display and a manufacturing method thereof having advantages of being capable of reducing a process time.

A liquid crystal display according to an exemplary embodiment includes: a substrate; a thin film transistor; a pixel electrode; a roof layer; a plurality of microcavities; and a partition wall. The thin film transistor is disposed on the substrate. The pixel electrode is disposed on the thin film transistor. The roof layer faces the pixel electrode. The microcavities are between the pixel electrode and the roof layer, the microcavities include a liquid crystal material. The partition wall is between the microcavities, and the partition wall is perpendicular to the roof layer.

A capping layer disposed on the roof layer may be further included, and the capping layer may contact an upper surface of the roof layer.

A liquid crystal injection hole formation region may be disposed between the microcavities, and the capping layer may cover the liquid crystal injection hole formation region.

A side surface of the roof layer contacting the capping layer in the liquid crystal injection hole formation region may be perpendicular to the substrate.

A common electrode facing the pixel electrode via a passivation layer interposed therebetween may be further included.

The partition may be protruded at the roof layer, and the partition wall and the roof layer are integrally formed.

A common electrode disposed between the microcavities and the roof layer may be further included.

The common electrode may be disposed between the partition wall and the roof layer.

The common electrode may have a surface parallel to the substrate at the partition wall.

The common electrode and the roof layer may be in contact.

A manufacturing method of a liquid crystal display according to an exemplary embodiment includes the following. A mother roof layer is formed on a carrier substrate. The mother roof layer is patterned by using a mold to form a transfer structure. The transfer structure is transferred onto a display panel including a thin film transistor. The carrier substrate is separated from the transfer structure. A plurality of microcavities and a liquid crystal injection hole formation region is formed on the display panel. A liquid crystal material is injected into the microcavities through the liquid crystal injection hole formation region. A capping layer is formed on the roof layer to fill the liquid crystal injection hole formation region.

The mold may include a first region and a second region, the first region may be partitioned by a groove, and the second region may be thicker than the first region.

The forming of the transfer structure may include forming a roof layer and a partition wall at a portion corresponding to the first region of the mold and forming a trench at a portion corresponding to the second region of the mold.

The transferring of the transfer structure may position the partition wall at a portion corresponding to a light blocking region of the display panel.

The method may further include hardening the roof layer.

A manufacturing method of a liquid crystal display according to an exemplary embodiment includes the following. A mother roof layer is formed on a carrier substrate. A common electrode is formed at the mother roof layer. A mother partition wall is formed on the common electrode and the mother partition wall is patterned by using a mold to form a transfer structure. The transfer structure is transferred onto a display panel including a thin film transistor. The carrier substrate is separated from the transfer structure. A portion of the mother roof layer is removed to expose a portion of the common electrode. The exposed portion of the common electrode is etched. A plurality of microcavities and a liquid crystal injection hole formation region is formed on the display panel. A liquid crystal material is injected into the microcavities through the liquid crystal injection hole formation region. A capping layer is formed to fill the liquid crystal injection hole formation region.

The mold may include a first region and a second region, the first region may be partitioned by a groove, and the second region may have the same thickness as the first region.

The forming of the transfer structure may include forming a partition wall at a portion corresponding to the first region of the mold.

The transferring of the transfer structure may position the partition wall at a portion corresponding to a light blocking region of the display panel.

The method may further include removing a portion of the mother roof layer to form a roof layer and hardening the roof layer.

According to an exemplary embodiment, the cavity structure is formed by using the nano-imprinting or roll printing process and is transferred to the thin film transistor array panel such that the liquid crystal may be filled inside the cavity without a formation process of the sacrificial layer and the roof layer, thereby realizing a display.

DETAILED DESCRIPTION OF THE EMBODIMENTS

Figure 1:
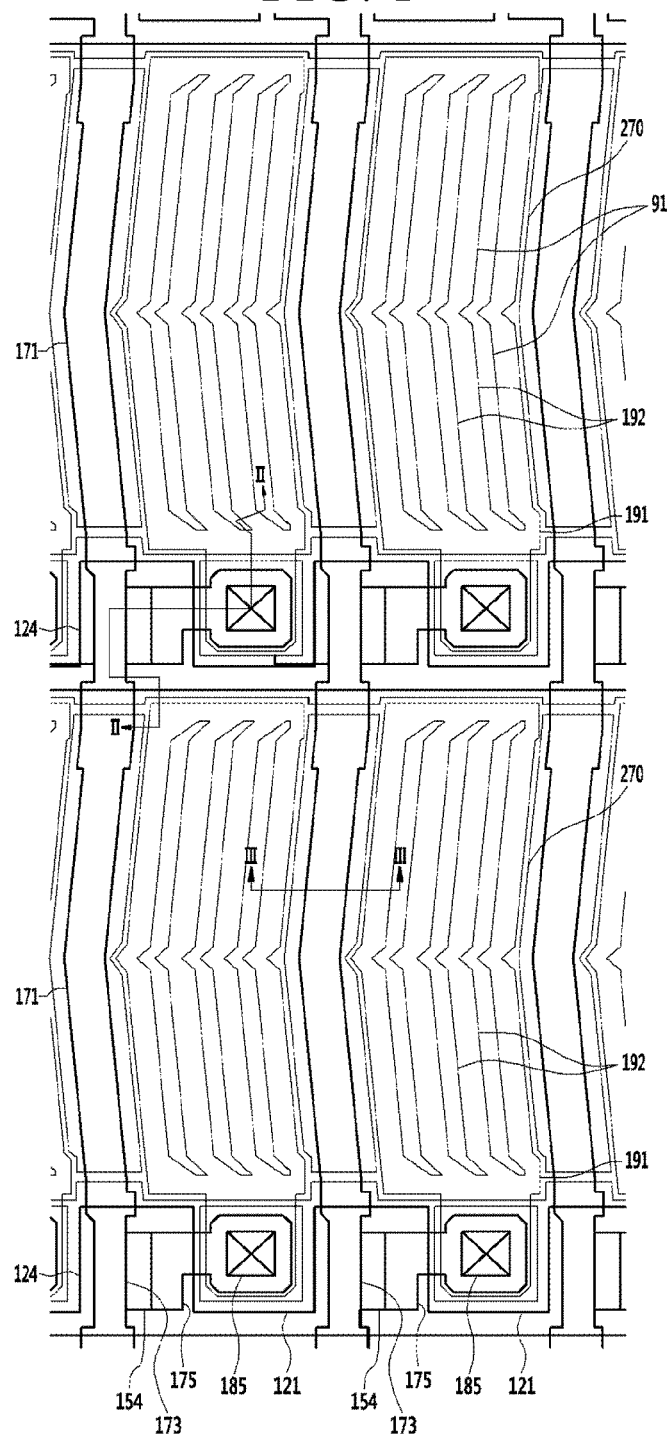
FIG. 1 is a top plan view of a liquid crystal display according to an exemplary embodiment.

Hereinafter, exemplary embodiments will be described in detail with reference to the accompanying drawings. As those skilled in the art would realize, the described embodiments may be modified in various different ways, all without departing from the spirit or scope of the inventive concept. On the contrary, exemplary embodiments introduced herein are provided to make disclosed contents thorough and complete, and sufficiently transfer the spirit of the inventive concept to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening elements may also be present. Like reference numerals designate like elements throughout the specification.

Figure 2:
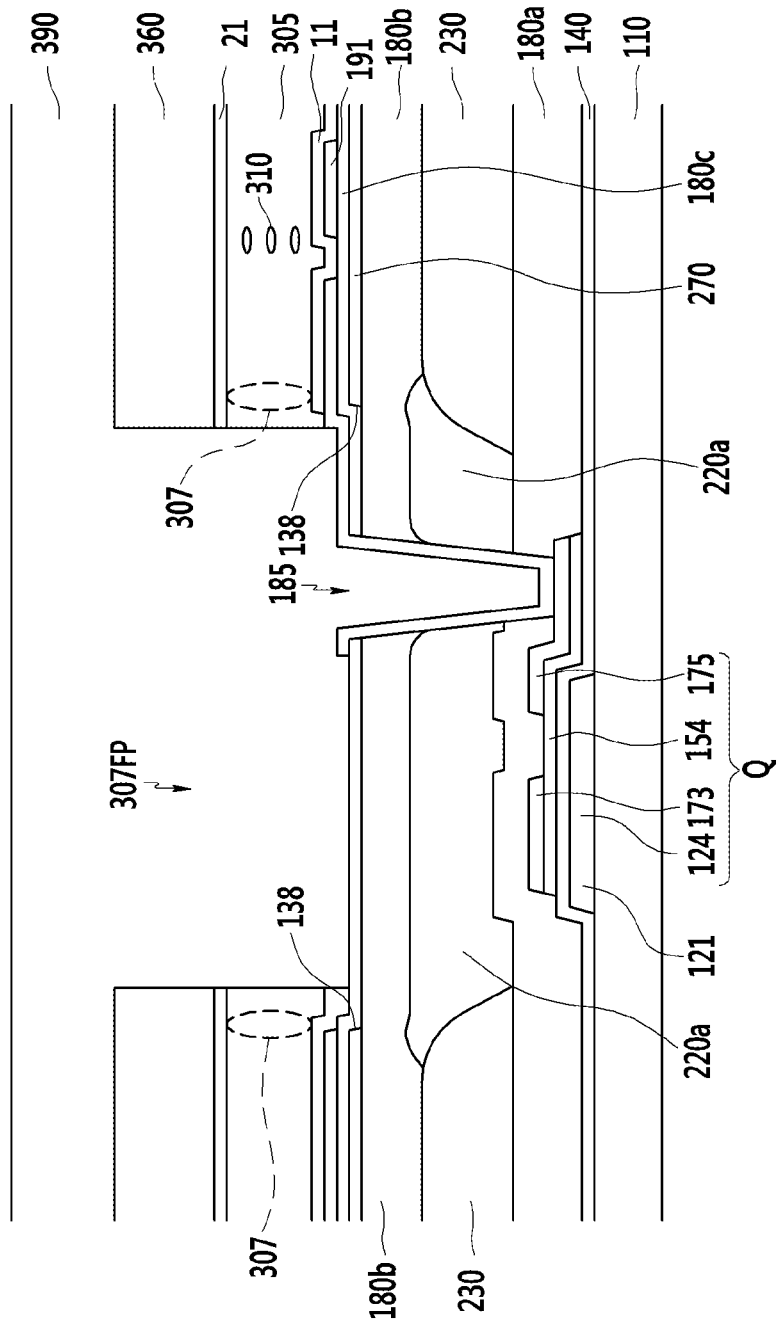
FIG. 2 is a cross-sectional view taken along the line II-II of FIG. 1.
Figure 3:
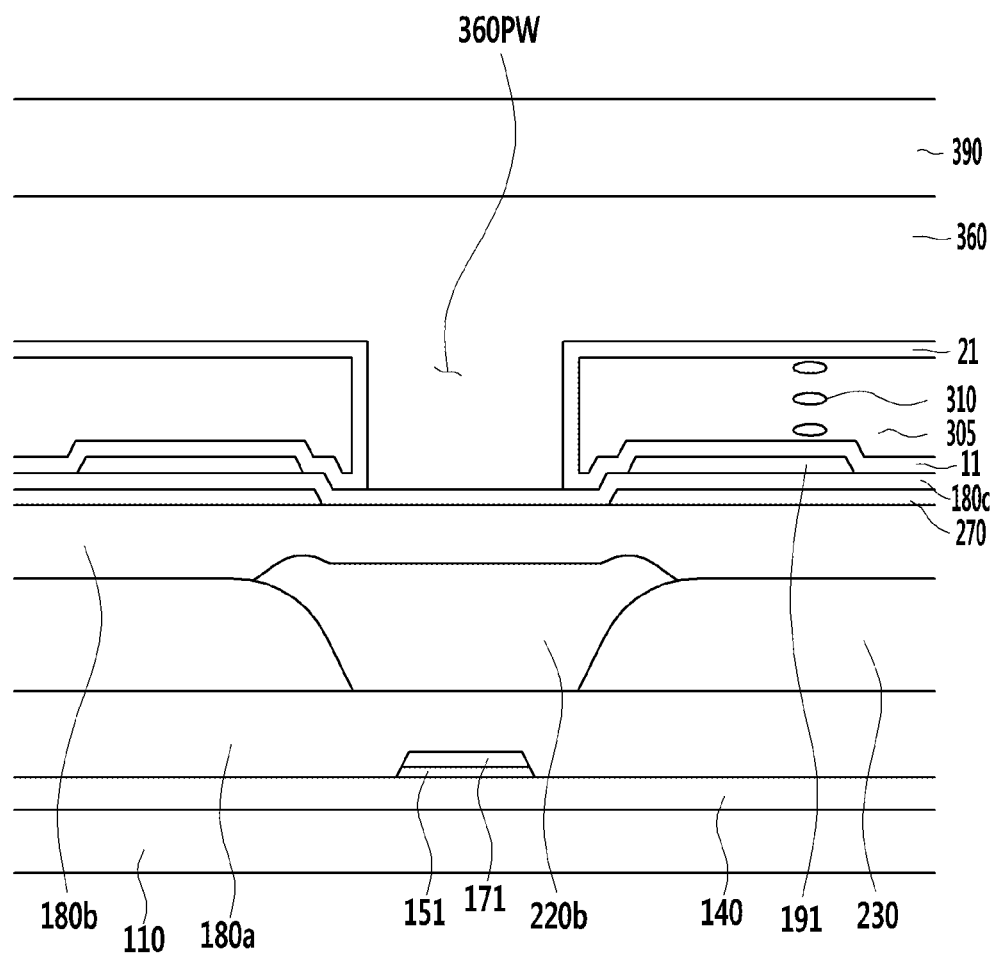
FIG. 3 is a cross-sectional view taken along the line III-III of FIG. 1.

FIG. 1 is a top plan view of a liquid crystal display according to an exemplary embodiment. FIG. 2 is a cross-sectional view taken along a line II-II of FIG. 1. FIG. 3 is a cross-sectional view taken along a line III-III of FIG. 1.

Referring to FIG. 1 to FIG. 3, a gate line 121 is formed on an insulating substrate 110 formed of transparent glass or plastic. The gate line 121 includes a gate electrode 124 and a wide end portion (not illustrated) for connection with another layer or an external driving circuit. The gate line 121 may be formed of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may also have a multilayer structure including at least two conductive layers having different physical properties.

A gate insulating layer 140 made of a silicon nitride ($SiN_x$) or a silicon oxide ($SiO_x$) is formed on the gate line 121. The gate insulating layer 140 may have a multilayer structure including at least two conductive layers having different physical properties. A semiconductor layer 151 disposed under a data line 171 and a semiconductor layer 154 disposed under a source/drain electrode and at a channel portion of a thin film transistor Q are formed on the gate insulating layer 140. The semiconductor layer 154 may be made of amorphous silicon or polysilicon, or an oxide semiconductor.

A plurality of ohmic contacts may be formed on each of the semiconductor layers 151 and 154, and between the data line 171 and source/drain electrodes, but this is omitted in the drawings.

Data conductors 171, 173, and 175 including a source electrode 173, the data line 171 connected with the source electrode 173, and a drain electrode 175 are formed on each of the semiconductor layers 151 and 154 and the gate insulating layer 140. The data line 171 includes a wide end portion (not illustrated) for connection with another layer or an external driving circuit. The data line 171 transfers a data signal, and extends mainly in a vertical direction to cross the gate line 121.

The source electrode 173 is a part of the data line 171, and is disposed on the same line as the data line 171. The drain electrode 175 is formed to extend in parallel with the source electrode 173. Accordingly, the drain electrode 175 is parallel with a part of the data line 171. The structure of the source electrode 173 and the drain electrode 175 may be changed.

The gate electrode 124, the source electrode 173, and the drain electrode 175 form one thin film transistor Q together with the semiconductor 154, and a channel of the thin film transistor Q is disposed in the semiconductor 154 between the source electrode 173 and the drain electrode 175.

The data line 171 and the drain electrode 175 may be made of a refractory metal such as molybdenum, chromium, tantalum, and titanium, or an alloy thereof, and may have a multilayered structure including a refractory metal layer (not illustrated) and a low resistance conductive layer (not illustrated). An example of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer.

A first passivation layer 180a is formed on the data conductors 171, 173, and 175 and the exposed semiconductor layer 154. The first passivation layer 180a may include the inorganic insulator such as a silicon nitride ($SiN_x$), a silicon oxide ($SiO_x$), or an organic insulator.

A color filter 230 and a light blocking member (220a and 220b) are formed on the first passivation layer 180a.

The light blocking member (220 and 220b) has a lattice structure having an opening corresponding to a region displaying an image, and is formed of a material preventing light from being transmitted therethrough. The color filter 230 is formed at the opening of the light blocking member (220a and 220b). The light blocking member (220 and 220b) includes a horizontal light blocking member 220a formed in a direction parallel to the gate line 121 and a vertical light blocking member 220b formed in a direction parallel to the data line 171.

The color filter 230 may display one of the primary colors, such as three primary colors including red, green, and blue. However, the colors are not limited to the three primary colors including red, green, and blue, and the color filter 230 may also display one among a cyan-based color, a magenta-based color, a yellow-based color, and a white-based color. The color filter 230 may be formed of materials displaying different colors for each adjacent pixel.

A second passivation layer 180b is formed to cover the color filter 230 and the light blocking members 220a and 220b, sometimes collectively referred to as a light blocking member 220. The second passivation layer 180b may include the inorganic insulating material, such as a silicon nitride ($SiN_x$) and a silicon oxide ($SiO_x$), or the organic insulating material. Contrary to the illustration in the cross-sectional view of FIG. 2, in a case where a step is generated due to a difference in thickness between the color filter 230 and the light blocking member 220, the second passivation layer 180b includes an organic insulating material, so that it is possible to decrease or remove the step.

The color filter 230, the light blocking members 220a and 220b, and the passivation layers 180a and 180b have a contact hole 185 extending to and exposing the drain electrode 175.

A common electrode 270 is formed on the second passivation layer 180b. The common electrode 270 has a planar shape, may be formed on the entire insulating substrate 110 as a plate, and may have an opening 138 formed in the region corresponding to the periphery of the drain electrode 175. That is, the common electrode 270 may have a planar plate shape.

The common electrodes 270 disposed on adjacent pixels are connected to each other to receive a common voltage of a predetermined level supplied from outside of the display area.

An interlayer insulating layer 180c is formed on the common electrode 270. The interlayer insulating layer 180c may be formed of the organic insulating material or the inorganic insulating material.

A pixel electrode 191 is disposed on the interlayer insulating layer 180c. The pixel electrode 191 may be formed of a transparent conductive material such as ITO or IZO. The pixel electrode 191 includes a plurality of cutouts 91 and a plurality of branch electrodes 192 disposed between adjacent cutouts.

The first passivation layer 180a, the second passivation layer 180b, and the interlayer insulating layer 180c have the contact hole 185 extending to and exposing the drain electrode 175. The pixel electrode 191 is physically and electrically connected to the drain electrode 175 through the contact hole 185 to receive a voltage from the drain electrode 175.

The common electrode 270 is a first field generating electrode or a first electrode, and the pixel electrode 191 is a second field generating electrode or a second electrode. The pixel electrode 191 and the common electrode 270 may form a horizontal electric field. The pixel electrode 191 and the common electrode 270 as field generating electrodes generate an electrical field such that the liquid crystal molecules 310 disposed thereon are rotated in a direction parallel to the direction of the electric field. As such, according to the determined rotation direction of the liquid crystal molecules, polarization of light passing through the liquid crystal layer is changed.

According to the liquid crystal display of the shown exemplary embodiment, the common electrode 270 has the planar shape and the pixel electrode 191 has a plurality of branch electrodes 192, however according to a liquid crystal display of another exemplary embodiment, the pixel electrode 191 may have a planar shape and the common electrode 270 may have a plurality of branch electrodes.

Embodiments are applied to all cases in which two field generating electrodes overlap via the insulating layer on the substrate 110, the first field generating electrode under the insulating layer has the plane shape, and the second field generating electrode on the insulating layer has a plurality of branch electrodes.

A lower alignment layer 11 is formed on the pixel electrode 191 and the lower alignment layer 11 may include a photo-alignment material.

An upper alignment layer 21 is provided at a portion facing the lower alignment layer 11, and a microcavity 305 is formed between the lower alignment layer 11 and the upper alignment layer 21. A liquid crystal material including liquid crystal molecules 310 is injected into the microcavity 305 through a liquid crystal injection hole 307.

The microcavity 305 may be formed in a column direction, that is, a vertical direction, of the pixel electrode 191. In the exemplary embodiment, the alignment material forming the alignment layers 11 and 21 and the liquid crystal material including the liquid crystal molecules 310 may be injected into the microcavity 305 by using capillary force.

The microcavity 305 is divided in a vertical direction by a plurality of liquid crystal injection hole formation regions 307FP disposed at a portion overlapping the gate line 121, and a plurality of microcavities 305 may be formed along the direction in which the gate line 121 is extended. Each of the plurality of formed microcavities 305 may correspond to a pixel area, and the pixel areas may correspond to a region displaying an image.

A roof layer 360 is provided on the upper alignment layer 21. The roof layer 360 serves as a support member so that the microcavity 305 is formed. The roof layer 360 may include a photoresist or other organic materials.

A capping layer 390 is provided on the roof layer 360. In the exemplary embodiment, the capping layer 390 fills the liquid crystal injection hole formation region 307FP and covers the liquid crystal injection hole 307 of the microcavity 305 exposed by the liquid crystal injection hole formation region 307FP. The capping layer 390 includes an organic material or an inorganic material.

In the present exemplary embodiment, the capping layer 390 may be brought into contact with a side surface and an upper surface of the roof layer 360. In the liquid crystal injection hole formation region 307FP, the side surface of the roof layer 360 contacting the capping layer 390 may be substantially perpendicular to the substrate 110.

In the present exemplary embodiment, as shown in FIG. 3, a partition wall 360PW is disposed between the microcavities 305 adjacent to each other in a horizontal direction. The partition wall 360PW may be formed in an extending direction of the data line 171, and is protruded at the roof layer 360. The partition wall 360PW is formed with the same material as the roof layer 360, and the partition wall 360PW and the roof layer 360 are integrally formed. In the present exemplary embodiment, the partition wall 360PW and the roof layer 360 may be substantially perpendicular.

The partition wall 360PW can partition or define the microcavities 305. In the present exemplary embodiment, since the partition wall 360PW is formed between the microcavities 305, less stress may be generated even when the substrate 110 is bent, and the deformation level of a cell gap may be further reduced.

Hereafter, a manufacturing method of a liquid crystal display according to an exemplary embodiment will be described with reference to FIG. 4A to FIG. 4I.

FIG. 4A to FIG. 4I are perspective views of a manufacturing method of a liquid crystal display according to an exemplary embodiment.

Figure 4A:
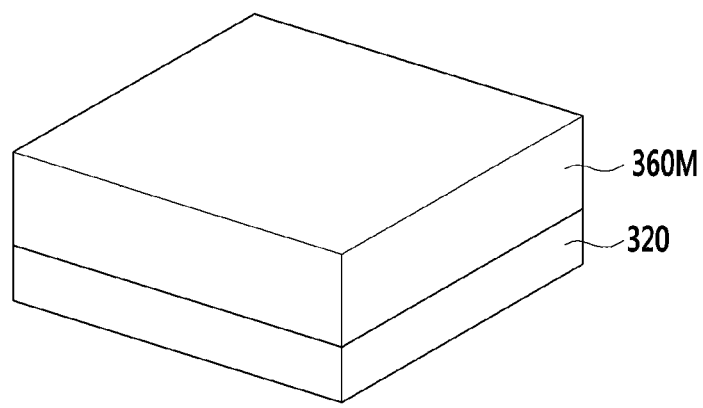
FIGS. 4A, 4B, 4C, 4D, 4E, 4F, 4G, 4H, 4I are perspective views showing a manufacturing method of a liquid crystal display according to an exemplary embodiment.

Referring to FIG. 4A, a mother roof layer 360M is formed on a carrier substrate 320. The mother roof layer 360M may be formed of an organic material capable of being subjected to a photo-process.

Figure 4B:
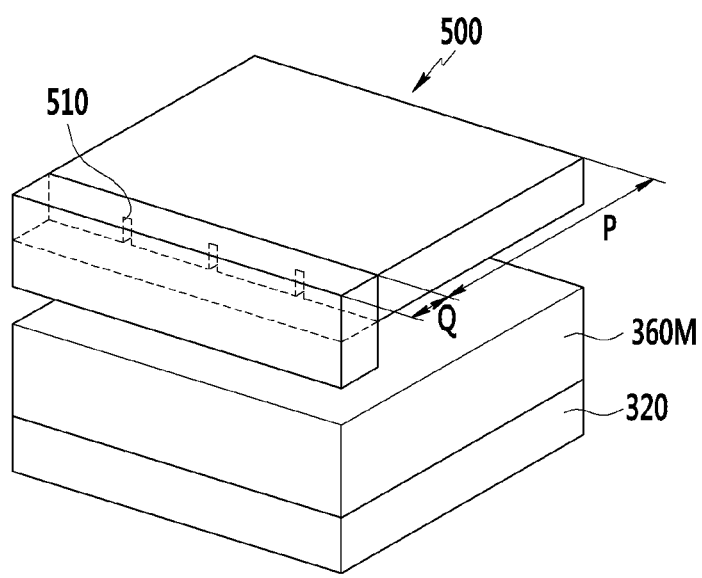

Referring to FIG. 4B, a mold 500 including a first region P and a second region Q is disposed to face the mother roof layer 360M. A plurality of grooves 510 that are elongated are formed at the first region P of the mold 500, and the grooves 510 may partition adjacent pixel areas.

The second region Q of the mold 500 is formed to be thicker than the first region P.

Figure 4C:
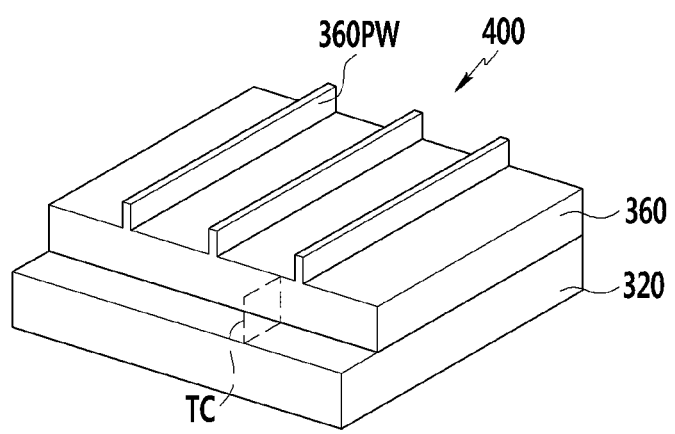

Referring to FIG. 4C, the mother roof layer 360M is patterned by using the mold 500 to form a transfer structure 400. The patterned mother roof layer 360M forms the roof layer 360 at a portion corresponding to the first region P of the mold 500, and the partition wall 360PW is formed on the roof layer 360. The partition wall 360PW is formed corresponding to the groove 510 of the mold 500. A portion of the mother roof layer 360M corresponding to the second region Q of the mold 500 is removed, thereby forming a trench TC. Although not shown, the transfer structure 400 is repeatedly formed in the extending direction of the partition wall 360PW. Accordingly, the trench TC is formed between the roof layers 360 of the transfer structures 400 adjacent to each other.

Figure 4D:
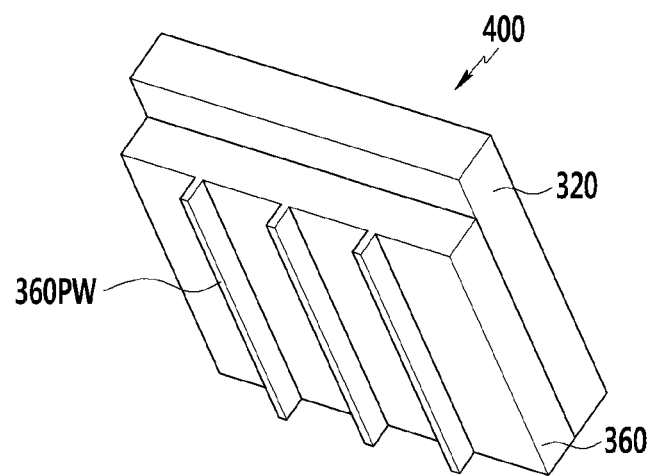
Figure 4D:
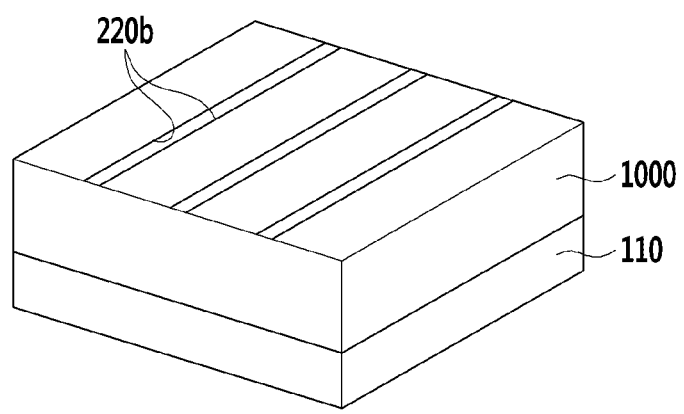

Referring to FIG. 4D, a display panel 1000 including a thin film transistor is prepared on the substrate 110. The manufacturing method of the display panel 1000 will again be described with reference to FIG. 1 to FIG. 3.

Referring to FIG. 1 to FIG. 3, in order to form a generally known switching element on the insulating substrate 110, the gate line 121 extended in the horizontal direction is formed, and the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to be extended in the vertical direction while crossing the gate line 121.

The first passivation layer 180a is formed on the data conductors 171, 173, and 175 including the source electrode 173, the drain electrode 175, and the data line 171, and the exposed semiconductor layer 154.

The color filter 230 is formed at a position corresponding to the pixel area on the first passivation layer 180a, and the light blocking member (220a and 220b) is formed between the color filters 230.

The second passivation layer 180b covering the color filter 230 and the light blocking member (220a and 220b) is formed on the color filter 230 and the light blocking member (220a and 220b), and the second passivation layer 180b is formed to have the contact hole 185 for electrically and physically connecting the pixel electrode 191 and the drain electrode 175.

Next, the common electrode 270 of the planar shape is formed on the second passivation layer 180b. The common electrode 270 has the opening 138 disposed at the portion overlapping the gate line 121 or the data line 171, but may be formed to be connected in adjacent pixels. The interlayer insulating layer 180c is formed on the common electrode 270, and a pixel electrode 191 is formed on the interlayer insulating layer 180c. The interlayer insulating layer 180c has the contact hole 185 for physically and electrically connecting the pixel electrode 191 and the drain electrode 175 along with the first passivation layer 180a and the second passivation layer 180b.

The pixel electrode 191 includes a plurality of cutouts 91 and a plurality of branch electrodes 192 disposed between the adjacent cutouts 91.

Again referring to FIG. 4D, the transfer structure 400 is disposed to face the display panel 1000.

Figure 4E:
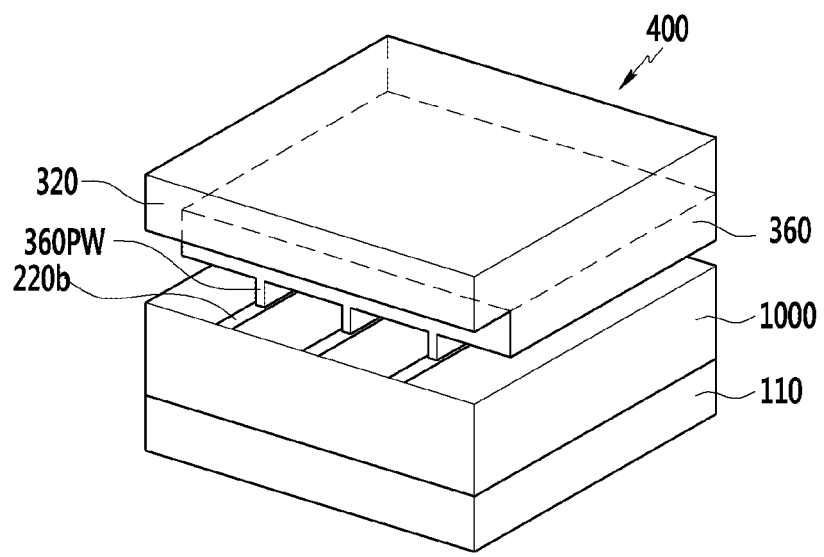

Referring to FIG. 4E, the transfer structure 400 is transferred on the display panel 1000 in a state that heat or pressure is applied. At this time, the partition wall 360PW of the transfer structure 400 is disposed at the portion corresponding to the vertical light blocking member 220b that corresponds to the light blocking region of the display panel 1000.

Figure 4F:
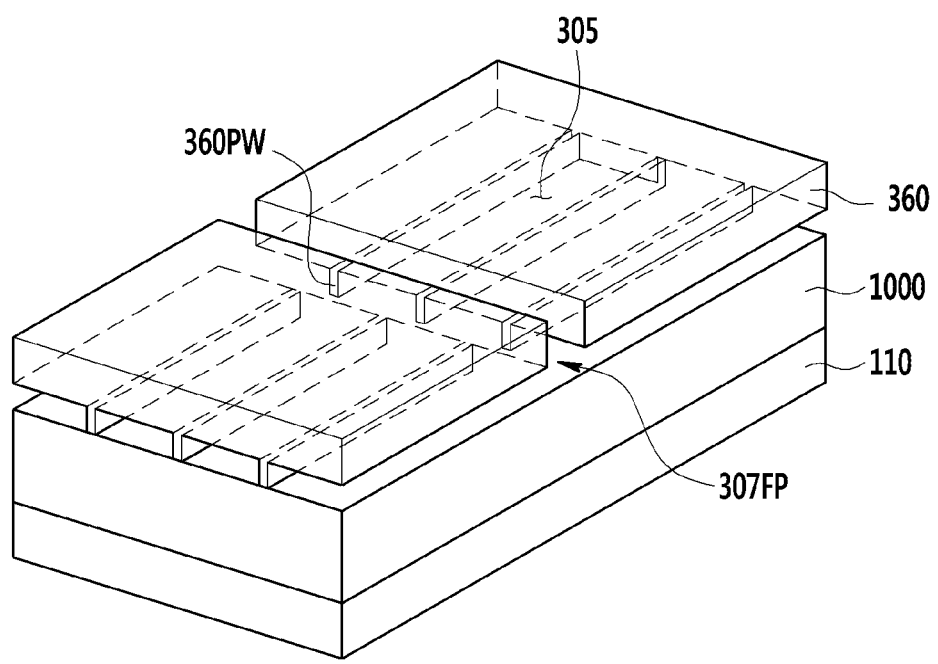

Referring to FIG. 4F, the carrier substrate 320 is separated from the transfer structure 400. Here, a plurality of microcavities 305 and liquid crystal injection hole formation regions 307FP partitioned by the partition wall 360PW may be formed on the display panel 1000. The liquid crystal injection hole formation region 307FP corresponds to the trench TC formed as shown in FIG. 4C.

Figure 4G:
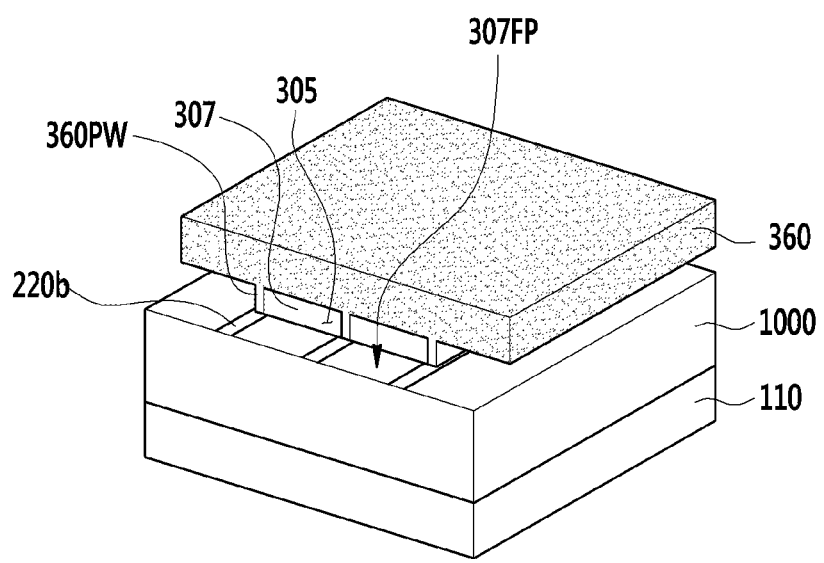

Referring to FIG. 4G, the roof layer 360 is hardened to improve durability of the roof layer 360. At this time, a hardening temperature may be in a range of about 150° C. to 250° C. Then, the liquid crystal material is dripped into the liquid crystal injection hole formation region 307FP, and then injected into the microcavities 305 through the liquid crystal injection hole 307 provided at an inlet of the microcavities 305. An aligning material may be injected into the microcavities 305 before the injection of the liquid crystal material.

Figure 4H:
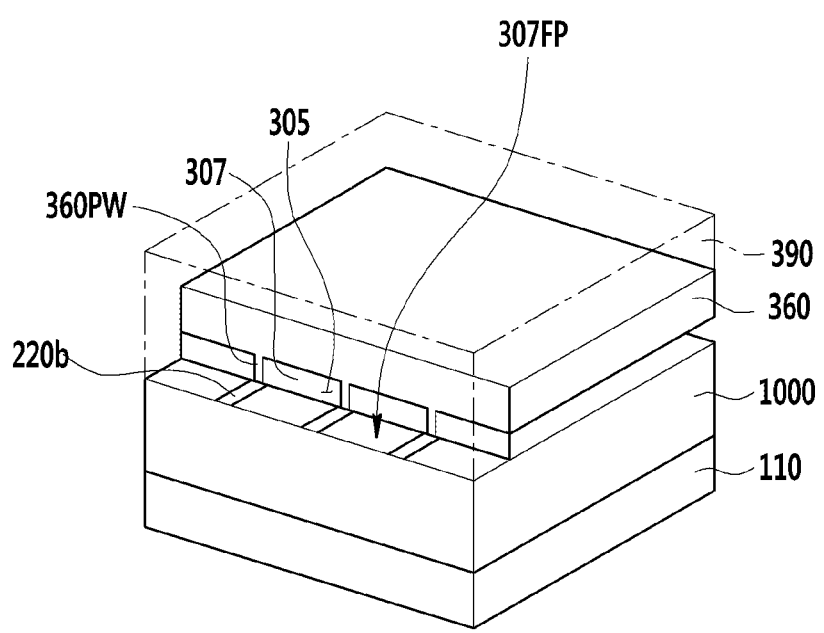

Referring to FIG. 4H, the capping layer 390 is formed to fill the liquid crystal injection hole formation region 307FP.

Figure 4I:
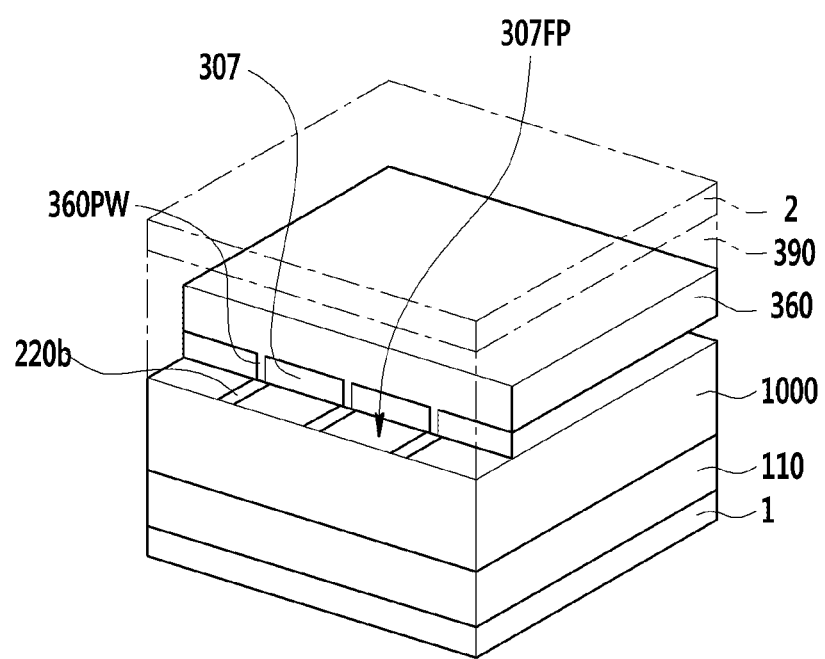

Referring to FIG. 4I, polarizers 1 and 2 may be attached to a lower side of the substrate 110 and an upper side of the capping layer 390, respectively.

Figure 5:
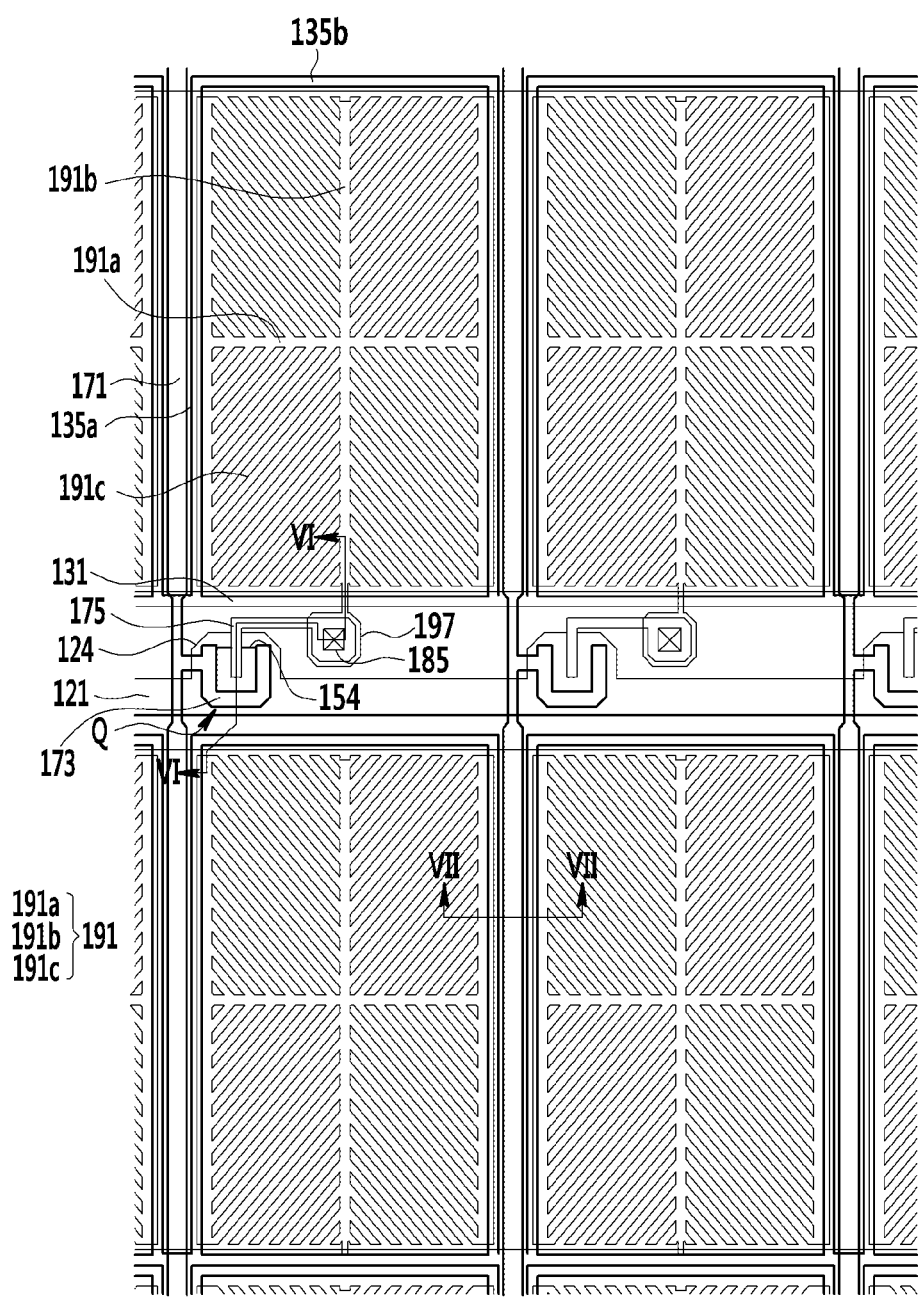
FIG. 5 is a top plan view of a liquid crystal display according to an exemplary embodiment.
Figure 6:
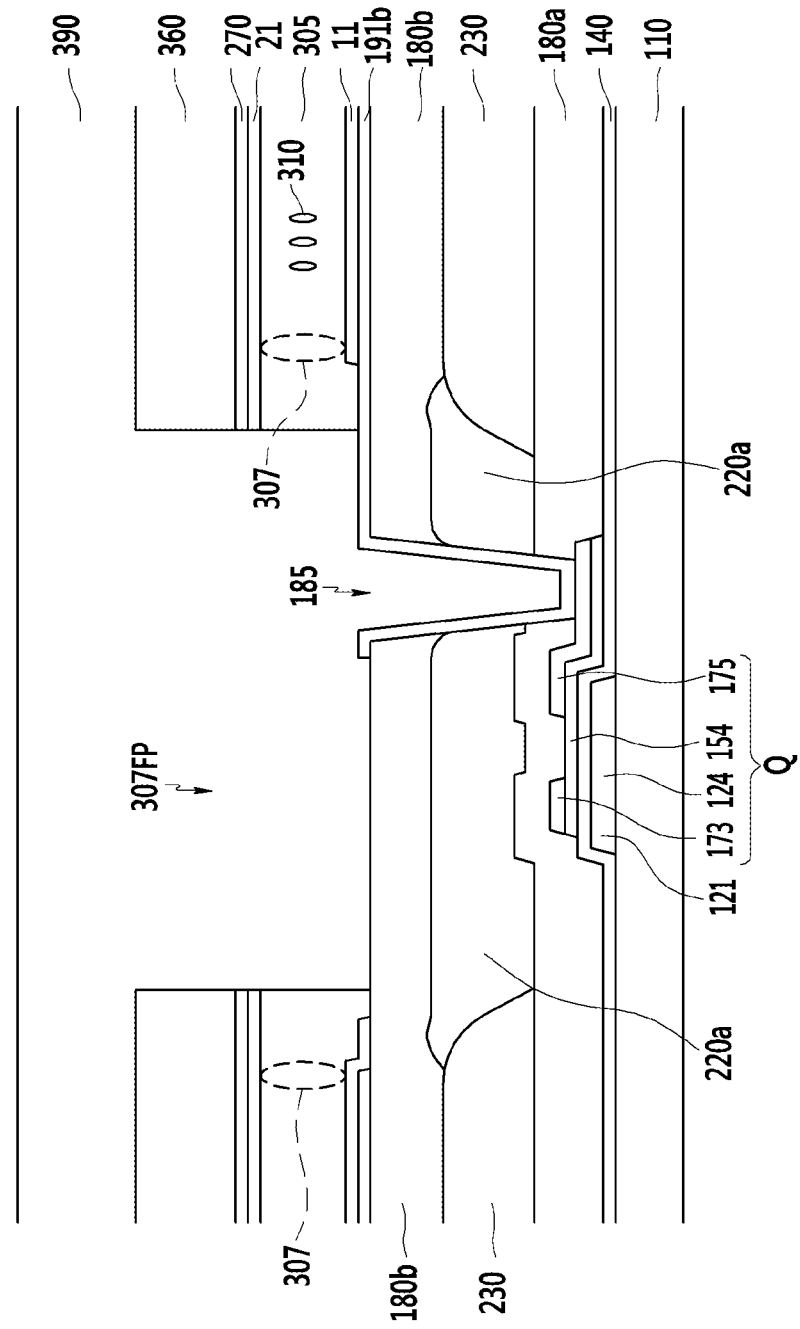
FIG. 6 is a cross-sectional view taken along the line VI-VI of FIG. 5.
Figure 7:
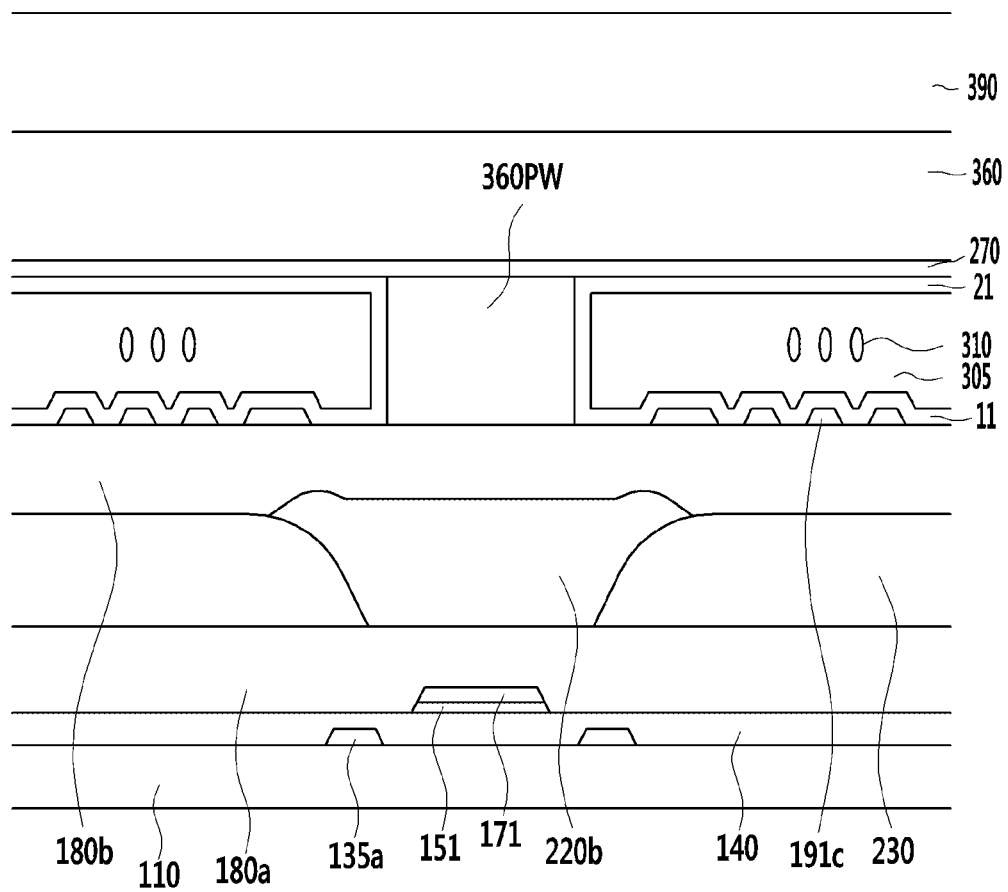
FIG. 7 is a cross-sectional view taken along the line of FIG. 5.

FIG. 5 is a top plan view of a liquid crystal display according to an exemplary embodiment. FIG. 6 is a cross-sectional view taken along a line VI-VI of FIG. 5. FIG. 7 is a cross-sectional view taken along a line VII-VII of FIG. 5.

Referring to FIG. 5 to FIG. 7, a gate line 121 and a storage electrode line 131 are formed on an insulating substrate 110 formed of transparent glass or plastic. The gate line 121 includes a gate electrode 124. The storage electrode line 131 is mainly extended in a horizontal direction, and transfers a predetermined voltage such as a common voltage Vcom. The storage electrode line 131 includes a pair of vertical storage electrode portions 135a substantially extended to be perpendicular to the gate line 121, and a horizontal storage electrode portion 135b connecting ends of the pair of vertical storage electrode portions 135a to each other. The storage electrode portions 135a and 135b have a structure surrounding a pixel electrode 191.

A gate insulating layer 140 is formed on the gate line 121 and the storage electrode line 131. A semiconductor layer 151 disposed at a lower portion of a data line 171, and a semiconductor layer 154 disposed at a lower portion of a source/drain electrode and at a channel portion of a thin film transistor Q, are formed on the gate insulating layer 140.

A plurality of ohmic contacts may be formed on each of the semiconductor layers 151 and 154, and between the data line 171 and the source/drain electrode, but this is omitted in the drawings.

Data conductors 171, 173, and 175 including a source electrode 173, a data line 171 connected with the source electrode 173, and a drain electrode 175 are formed on each of the semiconductor layers 151 and 154 and the gate insulating layer 140.

The gate electrode 124, the source electrode 173, and the drain electrode 175 form the thin film transistor Q together with the semiconductor layer 154, and a channel of the thin film transistor Q is formed on a portion of the semiconductor layer 154 between the source electrode 173 and the drain electrode 175.

A first passivation layer 180a is formed on the data conductors 171, 173, and 175, and an exposed portion of the semiconductor layer 154. The first passivation layer 180a may include an inorganic insulating material, such as a silicon nitride ($SiN_x$) and a silicon oxide ($SiO_x$), or an organic insulating material.

A color filter 230 and a light blocking member (220a and 220b) are formed on the first passivation layer 180a.

The light blocking member (220a and 220b) has a lattice structure having an opening corresponding to a region displaying an image, and is formed of a material preventing light from being transmitted therethrough. The color filter 230 is formed at an opening of the light blocking member (220a and 220b). The light blocking member (220a and 220b) includes a horizontal light blocking member 220a formed in a direction parallel to the gate line 121, and a vertical light blocking member 220b formed in a direction parallel to the data line 171.

The color filter 230 may display one of primary colors, such as three primary colors including red, green, and blue. However, the colors are not limited to the three primary colors including red, green, and blue, and the color filter 230 may also display one among a cyan-based color, a magenta-based color, a yellow-based color, and a white-based color. The color filter 230 may be formed of materials displaying different colors for each adjacent pixel.

A second passivation layer 180b covering the color filter 230 and the light blocking members (220a and 220b) is formed on the color filter 230 and the light blocking member (220a and 220b). The second passivation layer 180b may include the inorganic insulating material, such as a silicon nitride ($SiN_x$) and a silicon oxide ($SiO_x$), or the organic insulating material. Unlike the cross-sectional view of FIG. 6, in a case where a step is generated due to a difference in a thickness between the color filter 230 and the light blocking member (220a and 220b), the second passivation layer 180b includes an organic insulating material, so that it is possible to decrease or remove the step.

The color filter 230, the light blocking member (220a and 220b), and the passivation layers 180a and 180b have a contact hole 185 extending to and exposing the drain electrode 175.

The pixel electrode 191 is formed on the second passivation layer 180b. The pixel electrode 191 may be formed of a transparent conductive material such as ITO or IZO.

An overall shape of the pixel electrode 191 is a quadrangle, and the pixel electrode 191 includes cross stems configured by a horizontal stem 191a and a vertical stem 191b crossing the horizontal stem 191a. Further, the pixel electrode 191 is divided into four sub-regions by the horizontal stem 191a and the vertical stem 191b, and each sub-region includes a plurality of minute branches 191c. In the present exemplary embodiment, the pixel electrode 191 may further include an outer stem surrounding an outer circumference of the pixel electrode 191.

The minute branches 191c of the pixel electrode 191 form an angle of approximately 40° to 45° with the gate line 121 or the horizontal stem 191a. Further, the minute branches of two adjacent sub-regions may be perpendicular to each other. In addition, a width of the minute branches 191c is gradually increased, or a distance between the minute branches 191c may be varied.

The pixel electrode 191 includes an extension 197 which is connected at a lower end of the vertical stem 191b and has a larger area than the vertical stem 191b, and is physically and electrically connected with the drain electrode 175 through the contact hole 185 at the extension 197 to receive a data voltage from the data electrode 175.

The thin film transistor Q and the pixel electrode 191 described above are merely described as an example, and a structure of the thin film transistor and a design of the pixel electrode may be modified in order to improve side visibility.

A lower alignment layer 11 is formed on the pixel electrode 191, and may be a vertical alignment layer. The lower alignment layer 11, as a liquid crystal alignment layer made of a material such as polyamic acid, polysiloxane, polyimide, or the like, may include at least one of generally used materials.

An upper alignment layer 21 is disposed at a portion facing the lower alignment layer 11, and a microcavity 305 is formed between the lower alignment layer 11 and the upper alignment layer 21. A liquid crystal material including liquid crystal molecules 310 is injected into the microcavity 305 through a liquid crystal injection hole 307. The microcavity 305 may be formed in a column direction, that is, a vertical direction, of the pixel electrode 191. In the exemplary embodiment, the alignment material forming the alignment layers 11 and 21 and the liquid crystal material including the liquid crystal molecules 310 may be injected into the microcavity 305 by using capillary force.

The microcavity 305 is divided in a vertical direction by a plurality of liquid crystal injection hole formation regions 307FP disposed at a portion overlapping the gate line 121, and a plurality of microcavities 305 may be formed along the direction in which the gate line 121 is extended. Each of the plurality of formed microcavities 305 may correspond to a pixel area, and the pixel areas may correspond to a region displaying an image.

A common electrode 270 is disposed on the upper alignment layer 21. The common electrode 270 receives the common voltage, and generates an electric field together with the pixel electrode 191 to which the data voltage is applied to determine a direction in which the liquid crystal molecules 310 disposed at the microcavity 305 between the two electrodes are inclined. The common electrode 270 forms a capacitor with the pixel electrode 191 to maintain a received voltage even after the thin film transistor Q is turned off.

A roof layer 360 is disposed on the common electrode 270. The roof layer 360 serves as a support member so that the microcavity 305, which is a space between the pixel electrode 191 and the common electrode 270, is formed. The roof layer 360 may include the photoresist or other organic materials.

A capping layer 390 is provided on the roof layer 360. In the exemplary embodiment, the capping layer 390 fills the liquid crystal injection hole formation region 307FP and covers the liquid crystal injection hole 307 of the microcavity 305 exposed by the liquid crystal injection hole formation region 307FP. The capping layer 390 includes an organic material or an inorganic material.

In the present exemplary embodiment, the capping layer 390 may be brought into contact with a side surface and an upper surface of the roof layer 360. In the liquid crystal injection hole formation region 307FP, the side surface of the roof layer 360 contacting the capping layer 390 may be substantially perpendicular to the substrate 110.

In the present exemplary embodiment, as shown in FIG. 7, a partition wall 360PW is disposed between the microcavities 305 adjacent to each other in a horizontal direction. The partition wall 360PW is formed in an extending direction of the data line 171, and the common electrode 270 is provided between the partition wall 360PW and the roof layer 360. In the present exemplary embodiment, the common electrode 270 is provided above the microcavities 305 to extend therethrough and above the partition wall 360PW. At this time, the common electrode 270 disposed on the partition wall 360PW may have a surface parallel to the substrate 110. In the present exemplary embodiment, the partition wall 360PW is not brought into contact with the roof layer 360, and the partition wall 360PW and the roof layer 360 may be substantially perpendicular to each other.

The partition wall 360PW can partition or define the microcavities 305. In the present exemplary embodiment, since the partition wall 360PW is formed between the microcavities 305, less stress may be generated even when the substrate 110 is bent, and the deformation level of the cell gap may be further reduced.

Hereafter, a manufacturing method of a liquid crystal display according to an exemplary embodiment will be described with reference to FIG. 8A to FIG. 8L.

FIG. 8A to FIG. 8L are perspective views of a manufacturing method of a liquid crystal display according to an exemplary embodiment.

Figure 8A:
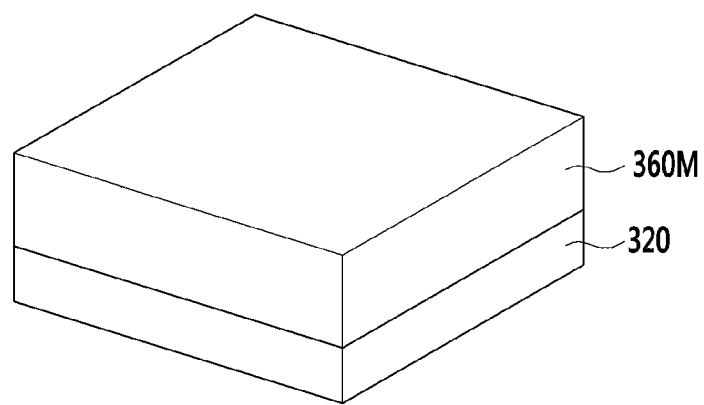
FIG. 8A, 8B, 8C, 8D, 8E, 8F, 8G, 8H, 8I, 8J, 8K, 8L are perspective views showing a manufacturing method of a liquid crystal display according to an exemplary embodiment.

Referring to FIG. 8A, a mother roof layer 360M is formed on the carrier substrate 320. The mother roof layer 360M may be formed of an organic material capable of being subjected to a photo-process.

Figure 8B:
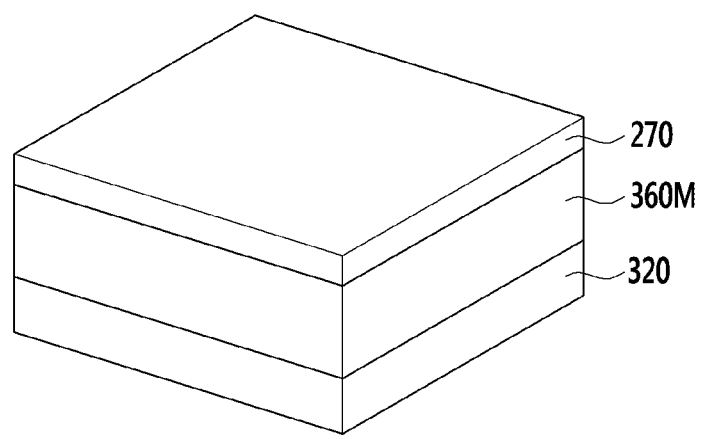

Referring to FIG. 8B, a common electrode 270 is formed on the mother roof layer 360M. The common electrode 270 is an electrode forming the electric field along with the pixel electrode 191.

Figure 8C:
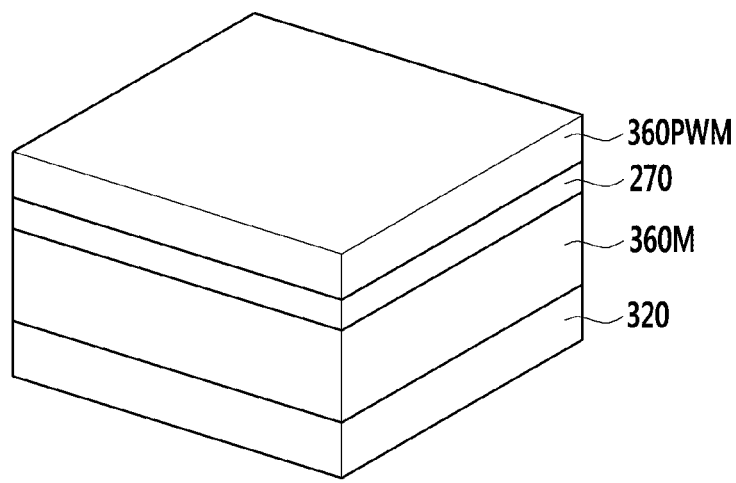

Referring to FIG. 8C, a mother partition wall 360PWM is formed on the common electrode 270.

Figure 8D:
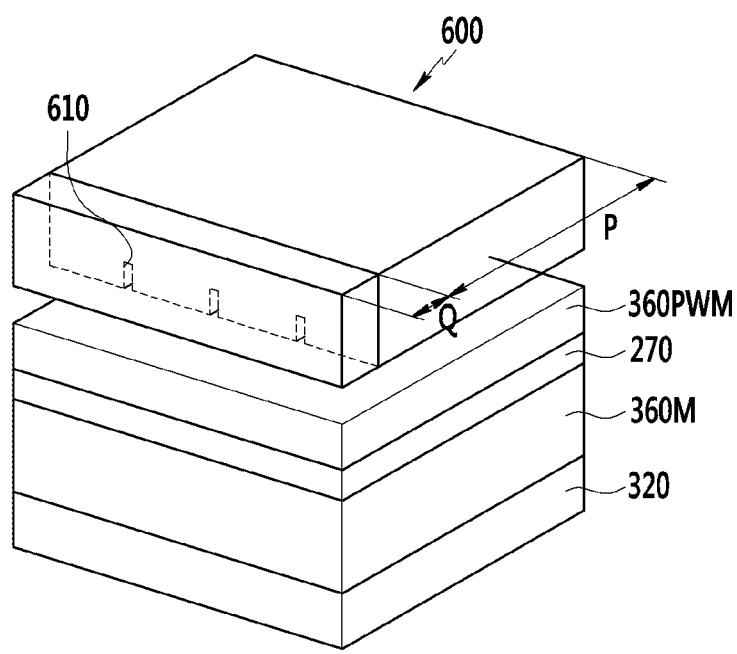

Referring to FIG. 8D, a mold 600 including a first region P and a second region Q is disposed to face the mother partition wall 360PWM. A plurality of elongated grooves 610 are formed in the first region P of the mold 600, and the grooves 610 partition the neighboring pixel areas.

The second region Q of the mold 600 may be formed to have the same thickness as the first region P.

Figure 8E:
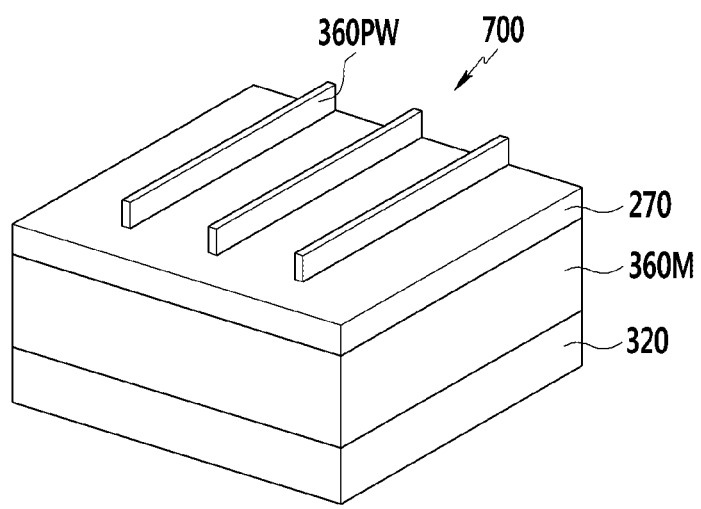

Referring to FIG. 8E, the mother partition wall 360PWM is patterned by using the mold 600 to form a transfer structure 700. The patterned mother partition wall 360PWM forms the partition wall 360PW at the portion corresponding to the first region P of the mold 600. The partition wall 360PW is formed corresponding to the groove 610 of the mold 600. The mother partition wall 360PWM corresponding to the second region Q of the mold 600 is removed. Although not shown, the transfer structure 700 is repeatedly formed in the extending direction of the partition wall 360PW.

Figure 8F:
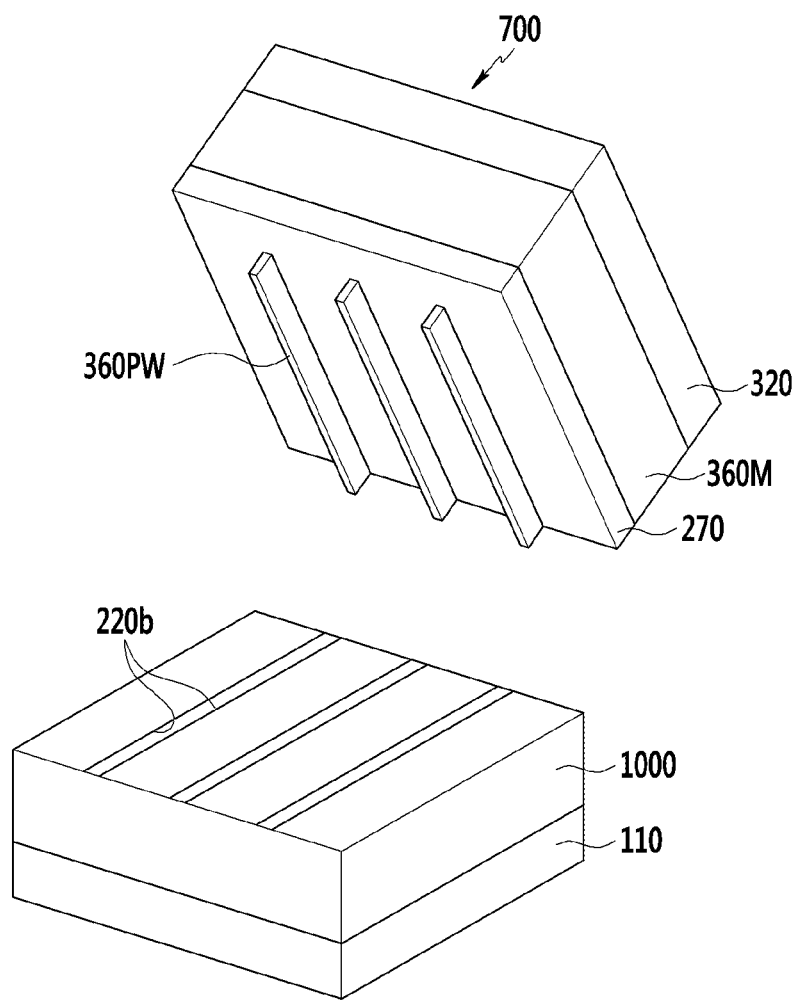

Referring to FIG. 8F, a display panel 1000 including a thin film transistor is prepared on the insulating substrate 110.

The manufacturing method of the display panel 1000 will be described again with reference to FIG. 5 to FIG. 7.

Referring to FIG. 5 to FIG. 7, in order to form a generally known switching element on the insulating substrate 110, the gate line 121 extended in the horizontal direction is formed, and the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to be extended in the vertical direction while crossing the gate line 121.

The first passivation layer 180a is formed on the data conductors 171, 173, and 175 including the source electrode 173, the drain electrode 175, and the data line 171, and an exposed portion of the semiconductor layer 154.

The color filter 230 is formed at a position corresponding to the pixel area on the first passivation layer 180a, and the light blocking member (220a and 220b) is formed between the color filters 230.

The second passivation layer 180b covering the color filter 230 and the light blocking member (220a and 220b) is formed on the color filter 230 and the light blocking member (220a and 220b), and the second passivation layer 180b is formed to have the contact hole 185 for electrically and physically connecting the pixel electrode 191 and the drain electrode 175.

Next, the pixel electrode 191 is formed on the second passivation layer 180b.

Again referring to FIG. 8F, the transfer structure 700 is disposed to face the display panel 1000.

Figure 8G:
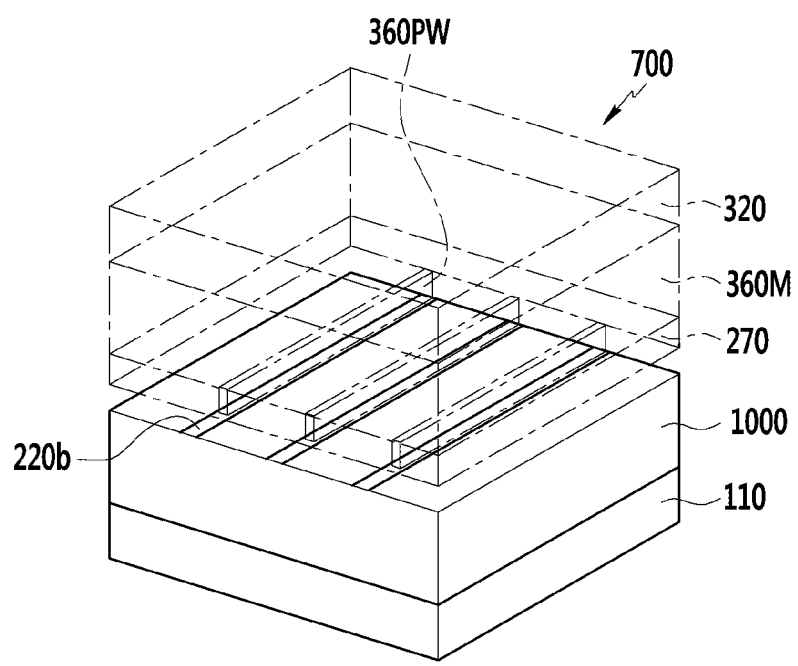

Referring FIG. 8G, the transfer structure 700 is transferred to the display panel 1000 in a state in which heat or pressure is applied. At this time, the partition wall 360PW of the transfer structure 700 is disposed to be disposed at the portion corresponding to the vertical light blocking member 220b that corresponds to the light blocking region of the display panel 1000.

Figure 8H:
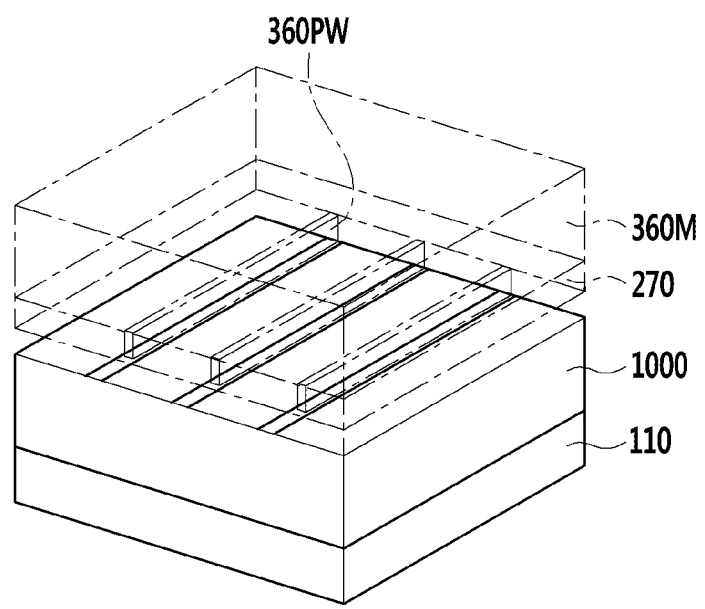

Referring to FIG. 8H, the carrier substrate 320 is separated from the transfer structure 700.

Figure 8I:
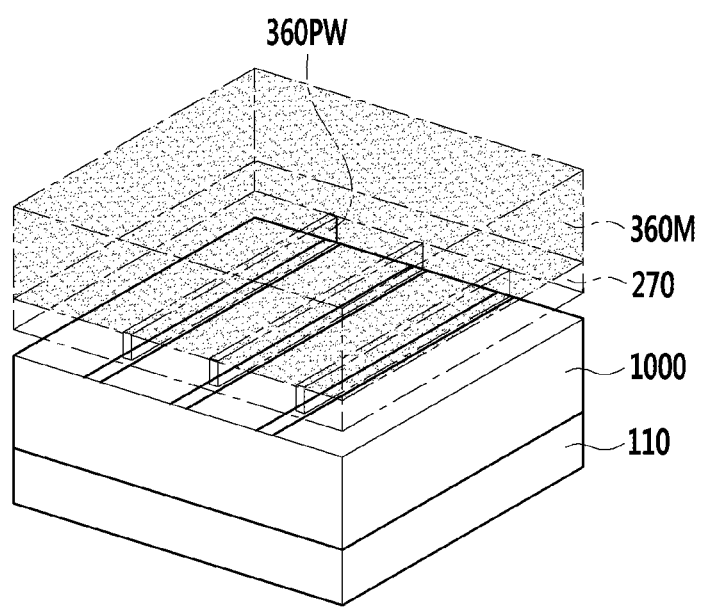

Referring to FIG. 8I, the mother roof layer 360M is hardened to improve the durability of the roof layer 360 that will be formed later. Herein, the hardening temperature is in a range of 150 to 250° C.

Figure 8J:
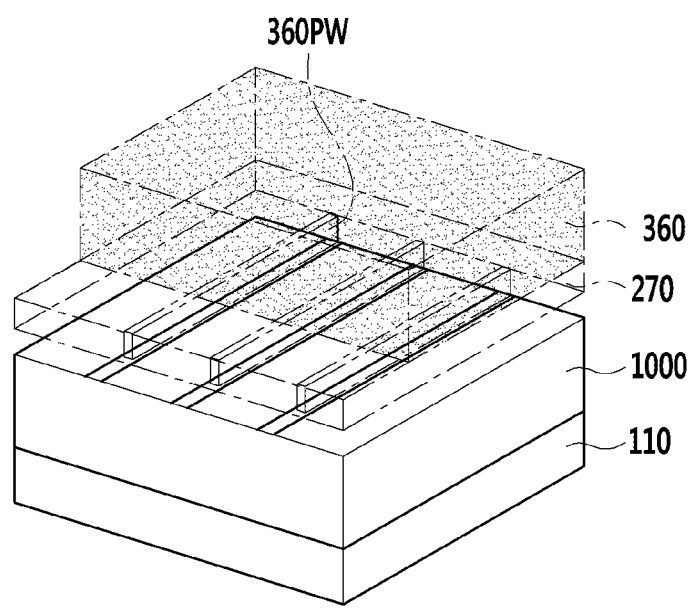

Referring to FIG. 8J, a portion of the mother roof layer 360M is removed by using a photomask to expose a portion of the common electrode 270. At this time, the portion of the mother roof layer 360M is removed thereby forming the roof layer 360.

Figure 8K:
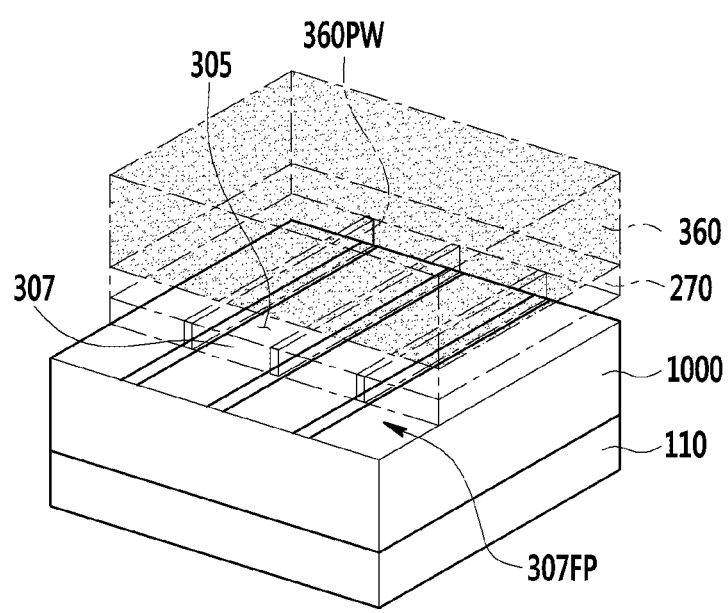

Referring to FIG. 8K, the exposed portion of the common electrode 270 is etched to be removed. Here, a plurality of microcavities 305 and liquid crystal injection hole formation regions 307FP partitioned by the partition wall 360PW may be formed on the display panel 1000. Then, the liquid crystal material is dripped into the liquid crystal injection hole formation region 307FP, and then injected into the microcavities 305 through the liquid crystal injection hole 307 provided at an inlet of the microcavities 305. An aligning material may be injected into the microcavities 305 before the injection of the liquid crystal material.

Figure 8L:
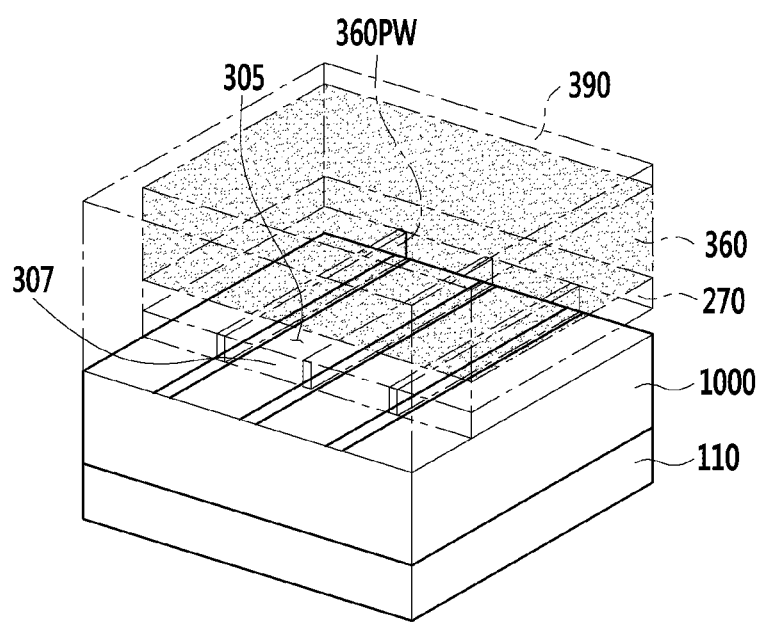

Referring to FIG. 8L, a capping layer 390 is formed to fill the liquid crystal injection hole formation region 307FP. Although not shown, a polarizer may be attached to a lower side of the insulating substrate 110 and an upper side of the capping layer 390.

The transfer structures 400 and 700 are formed by a nano-imprinting method, however it is not limited thereto, and the transfer structures 400 and 700 according to the present exemplary embodiment may be formed through various methods such as a roll printing method.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of Symbols>

| | | | |
|---|---|---|---|
| 310 | liquid crystal molecules | 305 | microcavity |
| 307 | liquid crystal injection hole | 360 | roof layer |
| 360PW | partition wall | 390 | capping layer |

What is claimed is:

1. A liquid crystal display comprising:
   a substrate;
   a thin film transistor disposed on the substrate;
   a pixel electrode disposed on the thin film transistor; and
   a roof layer facing the pixel electrode,
   wherein a plurality of microcavities are disposed between the pixel electrode and the roof layer, the microcavities include a liquid crystal material,
   a partition wall between the microcavities, wherein the partition wall is substantially perpendicular to the roof layer, the partition wall is protruded at the roof layer, and the partition wall and the roof layer are integrally formed.

2. The liquid crystal display of claim 1, further comprising a capping layer disposed on the roof layer, and the capping layer contacts an upper surface of the roof layer.

3. The liquid crystal display of claim 2, wherein a liquid crystal injection hole formation region is disposed between the microcavities, and the capping layer covers the liquid crystal injection hole formation region.

4. The liquid crystal display of claim 3, wherein a side surface of the roof layer contacting the capping layer in the liquid crystal injection hole formation region is substantially perpendicular to the substrate.

5. The liquid crystal display of claim 4, further comprising a common electrode facing the pixel electrode via a passivation layer interposed therebetween.

6. A liquid crystal display comprising:
   a substrate;
   a thin film transistor disposed on the substrate;
   a pixel electrode disposed on the thin film transistor; and
   a roof layer facing the pixel electrode,
   wherein a plurality of microcavities are disposed between the pixel electrode and the roof layer, the microcavities include a liquid crystal material,
   a partition wall between the microcavities, wherein the partition wall is substantially perpendicular to the roof layer;
   a common electrode disposed between the microcavities and the roof layer, wherein
   the common electrode is disposed between the partition wall and the roof layer.

7. The liquid crystal display of claim 6, wherein the common electrode has a surface parallel to the substrate at the partition wall.

8. The liquid crystal display of claim 7, wherein the common electrode and the roof layer are in contact.

* * * * *